United States Patent [19]

Kern

[11] Patent Number: 5,736,794
[45] Date of Patent: Apr. 7, 1998

[54] CIRCUIT ARRANGEMENT FOR PROVIDING SIGNAL CORRECTION INCLUDING A SWITCH-ON DELAY TIME PERIOD DURING WHICH A CORRECTION SIGNAL IS DETERMINED FOR USE DURING A FOLLOWING TIME PERIOD

[75] Inventor: Robert Kern, Sasbachwalden, Germany

[73] Assignee: Robert Bosch GmbH, Stuttgart, Germany

[21] Appl. No.: 646,357

[22] PCT Filed: Nov. 3, 1994

[86] PCT No.: PCT/DE94/01294

§ 371 Date: May 10, 1996

§ 102(e) Date: May 10, 1996

[87] PCT Pub. No.: WO95/13522

PCT Pub. Date: May 18, 1995

[30] Foreign Application Priority Data

Nov. 12, 1993 [DE] Germany ............ 43 38 709.8

[51] Int. Cl.[6] .................................................. B60L 1/14
[52] U.S. Cl. .................................. 307/10.8; 315/82
[58] Field of Search ............................ 307/9.1, 10.1, 307/10.8, 157, 131, 141, 141.4; 315/82, 209 R, 307; 327/306, 307, 379, 383, 387, 392, 398

[56] References Cited

U.S. PATENT DOCUMENTS 5,015,921 5/1991 Carlson et al. ................ 315/307

FOREIGN PATENT DOCUMENTS

| 0263305 | 4/1988 | European Pat. Off. |
| 2939517 | 4/1981 | Germany. |
| 3617936 | 12/1987 | Germany. |
| 63-274398 | 11/1988 | Japan. |

OTHER PUBLICATIONS

*Pressure Measurement Using "Smart" Transducers*, C. John Easton, Advances in Instrumentation, Oct. 21–24, 1985, Research Triangle Park, NC, USA, pp. 1153–1165.

*Primary Examiner*—Richard T. Elms
*Attorney, Agent, or Firm*—Spencer & Frank

[57] ABSTRACT

A circuit arrangement for affecting signals which contains a first and a second circuit element or section (10, 11). A switch-on delay unit (35) is disposed in the second circuit sections (11) which, after start-up of the two circuit elements (10, 11), maintains the first circuit section (10) in a switched-off state for a predetermined time (T). During the predetermined time (T) an idle level occurs at an output (40) of a signal processing unit (41) which is provided for detecting a measured value occurring in the first circuit section (10), for example. The idle level is stored in a memory (38). At the end of the predetermined time (T), the idle level stored in the memory (38) is used for the correction of the signal. A fresh correction value is available after each new start-up of the two circuit sections or elements (10, 11), so that long-time changes are taken into consideration.

11 Claims, 1 Drawing Sheet

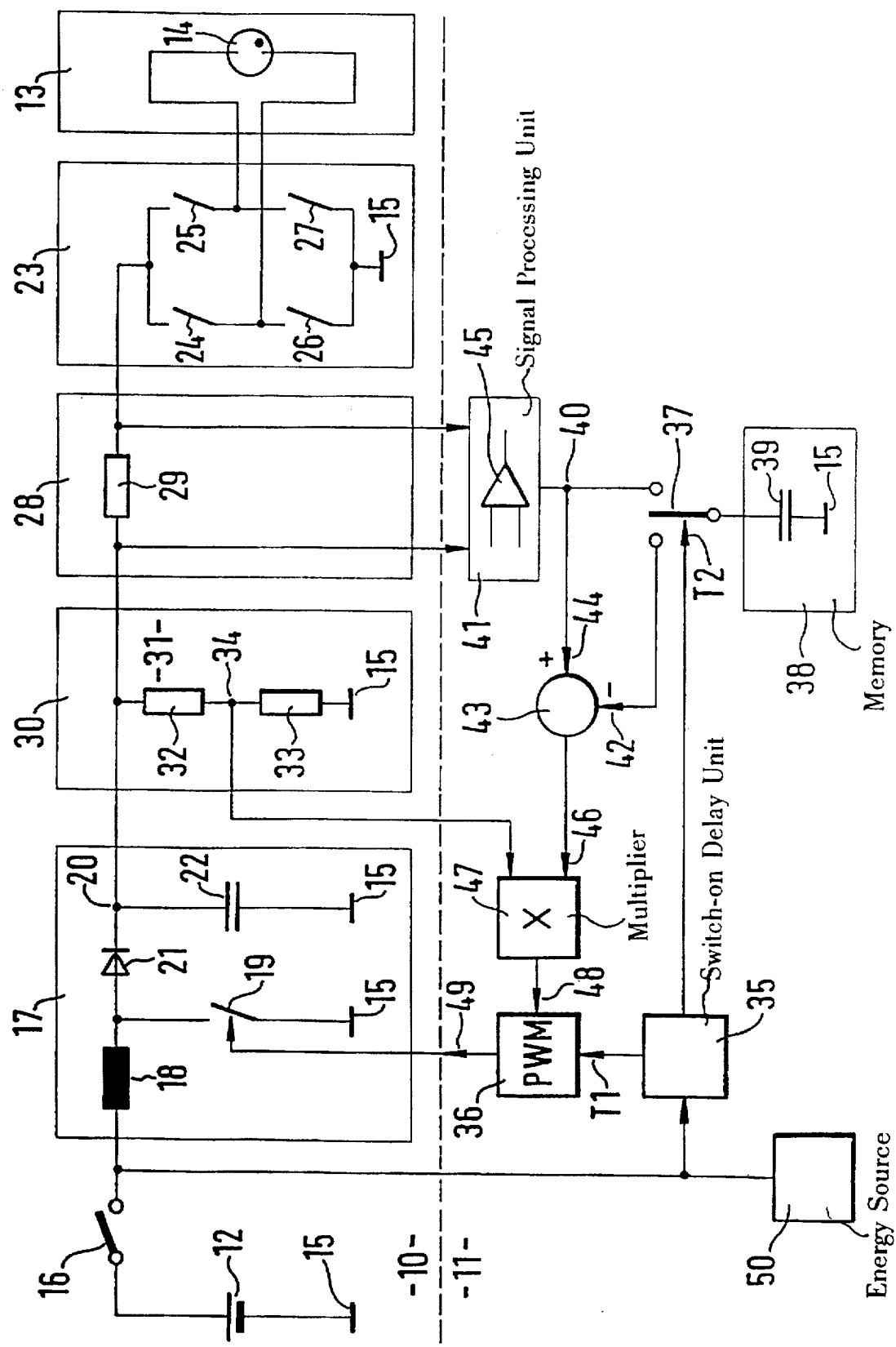

CIRCUIT ARRANGEMENT FOR PROVIDING SIGNAL CORRECTION INCLUDING A SWITCH-ON DELAY TIME PERIOD DURING WHICH A CORRECTION SIGNAL IS DETERMINED FOR USE DURING A FOLLOWING TIME PERIOD

BACKGROUND OF THE INVENTION

Prior Art

The invention is based on a circuit arrangement for affecting signals including a first circuit section in which at least one signal to be processed occurs, and a second circuit section containing a signal processing unit as well as a device for correcting the signal. Such a circuit arrangement is known from EP-A 0 263 305, wherein the measured values detected by sensors are supplied to amplifiers whose amplification factors and offset errors are corrected. The appropriate correction signals are derived from the output signals of the sensors in a correction signal path and, if required, from further sensors which detect the environmental parameters. The output signals of all sensors are supplied via a multiplexer disposed in the correction signal path to an analog/digital converter, whose digital output signal forms at least a portion of the address area of a memory. The digital correction values stored at defined memory locations are read out and converted back into analog signals via a digital/analog converter and are divided via a demultiplexer into the correction signals for the amplification factor and for the offset. The known circuit arrangement allows both the correction of errors which were detected during a calibration of the circuit arrangements at first start-up and also a correction of measurement signals as a function of environmental conditions present at that time. The correction values stored in the memory normally remain unchanged during the entire operating time of the known circuit arrangements. A possibly occurring long-time drift, in particular a long-time drift of an amplification factor or of an offset error of the amplifier cannot be detected and corrected under these circumstances.

SUMMARY OF THE INVENTION

It is the object of the invention to provide a circuit arrangement for affecting signals which make possible a correction of a signal by simple means.

The above object is attained according to the present invention by a circuit arrangement including a first circuit section in which at least one signal to be processed occurs, and a second circuit section containing a signal processing unit as well as a device for correcting the signal, with a memory, which stores an idle level occurring at an output of the signal processing unit contained in the device for correcting the signal, with the stored idle level being provided for correcting the processed signal, and wherein a switch-on delay unit is provided in the second circuit section which switch-on delay unit, following start-up of the two circuit sections, maintains the first circuit section in the switched-off state for the time (T) predetermined by the switch-on delay unit, the memory stores the occurring idle level during the predetermined time (T), and the signal correction is provided at the end of the predetermined time (T).

ADVANTAGES OF THE INVENTION

The circuit arrangement in accordance with the invention for affecting signals has the advantage that a long-time drift during processing of at least one signal can be corrected with a low outlay in switching technology. In particular, an offset error of an amplifier can be corrected. The circuit arrangement in accordance with the invention is divided into two circuit sections. A switch-on delay unit is provided in the second circuit section which keeps the first circuit section in the switched-off state for a predetermined time after start-up of both circuit sections. During the time predetermined by the switch-on delay unit, an idle level occurring at an output of a signal processing unit is stored in a memory and is used as the correction value for obtaining the correct signal at the end of the predetermined time at which the first circuit section is being placed into operation.

Advantageous developments and embodiments of the circuit arrangement for affecting signals in accordance with the invention ensue from the description.

An advantageous embodiment provides that the signal processing unit contains an operational amplifier whose offset error is determined each time the circuit arrangement is put into operation again. It is particularly advantageous that it is possible to employ a relatively low-priced operational amplifier which possibly has a comparatively large offset error.

An advantageous embodiment provides that at the end of the time predetermined by the switch-on delay unit the correction value stored in the memory is conveyed to an adder which adds the correction value with the correct sign to the processed signal at the output of the signal processing unit.

An advantageous development of the circuit arrangement in accordance with the invention provides that the switch-on delay unit disposed in the second circuit section cooperates with a control unit provided for a semiconductor component which is disposed in the first circuit section and performs a switching function. The semiconductor component preferably is provided as a switching element in a switching network element. With this step, maintaining the first circuit section in the switched-off state during the time predetermined by the switch-on delay unit is possible without additional means.

The circuit arrangement for affecting signals in accordance with the invention is particularly suitable for processing a measured value detected by a sensor. For example, the current flowing through an electrical consumer or load can be provided as the measured value and, in the simplest case, is detected by means of a measuring resistor, wherein an operational amplifier is employed for amplifying the voltage drop occurring at the measuring resistor.

The circuit arrangement in accordance with the invention is particularly suited for employment within the framework of an output regulation for an electrical consumer or load, in which a multiplicative linkage of measured values occurs which, without the correction of, for example, an offset error in the current detection, would have an increased deviation between the set output value and the actual output value. A high-pressure gas discharge lamp, for example, which preferably is disposed in a motor vehicle, can be provided as a consumer whose output is to be regulated. With this application decreased costs for signal processing in an assembly line production become particularly advantageously noticeable.

Further advantageous developments and embodiments of the circuit arrangement in accordance with the invention ensue from the further dependent claims together with the following description.

BRIEF DESCRIPTION OF THE DRAWINGS

The drawing FIGURE represents a block diagram of a preferred embodiment circuit an arrangement according to the invention for affecting signals containing a first and a second circuit section.

DETAILED DESCRIPTION OF THE PREFERRED EMBODIMENT

The drawing figure shows a first circuit section 10 and a second circuit section 11, which are drawn separated from each other by dashed lines. An energy source 12 is disposed in the first circuit section 10 which is intended for the energy supply of an electrical consumer or load 13 which, in the exemplary embodiment shown, is embodied as a gas discharge lamp 14.

The energy source 12 which is connected on one side to the ground 15, can be connected with a timed current supply unit 17 via a circuit closer 16. In the exemplary embodiment shown, the timed current supply unit 17 is embodied as a boost flyback converter, which contains an inductive element 18, a switching element 19 which selectively connects the inductive element 18 to the ground 15, a diode 21 leading to the output 20 of the timed current supply 17 and a smoothing capacitor 22 located between the output 20 and the ground 15.

The output 20 of the timed current supply 17 is connected with a bridge circuit 23, in whose diagonal the gas discharge lamp 14 is located. The bridge circuit 23 contains four bridge circuit elements 24, 25, 26, 27, whose control is not represented in detail in the drawing figure.

A current sensor 28 which, in the example shown, contains a measuring resistor 29, is provided for detecting a current flowing through the gas discharge lamp 14. A voltage sensor 30, containing a potentiometer 31 realized by means of two resistors 32, 33 connected in series, is provided for detecting a voltage occurring at the gas discharge lamp 14. The measured voltage value appears at a central tap 34 of the potentiometer 31.

The circuit closer 16 also connects the energy source 12 with an energy source 50, disposed in the second circuit element 11, and with a switch-on delay unit 35. The switch-on delay unit 35 sends a first switching signal T1 to a control unit 36 and a second switching signal T2 to a throw-over switch 37.

The throw-over switch 37 connects a memory 38 which, in the exemplary embodiment shown is designed as a storage capacitor 39, either with an output 40 of a signal processing unit 41 or with a negative input 42 of an adder 43. A positive input 44 of the adder 43 is connected with the output 40 of the signal processing unit 41.

The signal processing unit 41 contains at least one operational amplifier 45 which is supplied with the signal emitted by the current sensor 28.

An output signal 46 of the adder 41 is sent to a multiplier 47, which multiplies the output signal 46 by the measured voltage value present at the central tap 34 of the potentiometer 31 and passes on a result 48 to the control unit 36. The control unit 36 generates a control signal 49 for controlling the switching element 19.

The circuit arrangement in accordance with the invention functions as follows:

Following each start-up of the electrical consumer 13 by means of actuating the circuit closer 16,the first circuit element or section 10 is still maintained in the switched-off state for a time T, predetermined by the switch-on delay unit 35. The second circuit element or section 11 is immediately provided with energy following the actuation of the circuit closer 16. If necessary, the energy supply 50 is provided which, for example, can contain a voltage regulator.

Along with the first switching signal T1, the switch-on delay unit 35 passes on the predetermined time T via the control unit 36 and the control signal 49 emitted by the control unit 36 to the switching element 19 disposed in the timed current supply 17. The switching element 19 is preferably maintained in the open state during the predetermined time T. During the time T predetermined by the switch-on delay unit 35, the throw-over switch 37 is switched by means of the second switching signal T2 into that position in which the throw-over switch 37 connects the memory 38 with the output 40 of the signal processing unit 41.

In the exemplary embodiment shown, the two switching signals T1, T2 emitted by the switch-on delay unit 35 are separate of each other and therefore can have different levels and polarities. In another embodiment the two switching signals T1, T2 can be identical.

In a simple embodiment the memory 38 can be realized by means of the storage capacitor 39, which can store an analog value without any further steps. In another embodiment it is possible to realize the memory 38 in the form of a digital memory. In this embodiment further components, such as the throw-over switch 37, the adder 43, the multiplier 47, the switch-on delay unit 35 as well as the control unit 36 are preferably realized in a microprocessor system within the framework of a program flow.

During the time T predetermined by the switch-on delay unit, an idle level occurring at the output 40 of the signal processing unit 41 is stored in a memory 38. The idle level is, for example, an offset error which can occur in operational amplifiers 45 contained in the signal processing unit 41. An operational amplifier 45 is preferably provided in the signal processing unit 41, which amplifies the signal emitted by the current sensor 28 to a higher level. A relatively low-priced operational amplifier 45 can be used, wherein it possibly must be tolerated that a large offset error occurs, which corresponds to the idle level occurring at the output 40 during the time T predetermined by the switch-on delay unit 35.

The idle level emerges at the output 40 of the signal processing unit 41 during the time T predetermined by the switch-on delay unit 35, because during this period of time no current yet flows through the electrical consumer 13 which could cause a voltage drop at the measuring resistor 29 of the current sensor 28. At the end of the predetermined time T, the first circuit element 10 changes into the operational state by means of an appropriate issuance of the control signal 49 which, for example, is a pulse-width-modulated signal for actuating the switching element 17. The control signal 40 puts the timed current supply 19 into operation, whose function is not described in detail here. A d.c. voltage is present at the output of the timed current supply 17, which is stored by the smoothing capacitor 22 during the short-circuit phase of the switching element 19. A control circuit, not shown in detail, for actuating the bridge circuit elements 24 to 27 of the bridge circuit 23 goes into operation concurrently with the timed current supply 17. The bridge circuit 23 has the task of switching the electrical consumer 13 at a predetermined switch-over frequency between the ground 15 and the output 20 of the timed current supply 17. The purpose of this step is the elimination of a d.c. current component which would destroy certain consumers, such as the gas discharge lamp 14, for example.

Following the switch-on of the electrical consumer 13, wherein devices required for starting the gas discharge lamp 14 are not represented in the exemplary embodiment shown, a current flows through the electrical consumer 13 and is detected by the current sensor 28. The current sensor 28 which, for example, is a low-impedance measuring resistor 29, emits a signal as a measurement of the flowing current to the signal processing unit 41. It is the job of the signal processing unit 41 to amplify this signal in a manner which is easy to manipulate. In a simple realization of the signal processing unit 41, only an operational amplifier 45 is required, which is switched as a differential amplifier to amplify the voltage drop occurring at the measuring resistor 29. The processed signal emerges at the output 40 of the signal processing unit 41 and the offset error of the operational amplifier 45 is superimposed on it. The adder 43, whose positive input 44 is connected with the output 40 and whose negative input 42 is connected with the throw-over switch 37, is provided for obtaining the correct measured value. At the end of the time T predetermined by the switch-on delay unit 35, the throw-over switch 37 has been brought into a position in which the memory 38 is connected with the negative input 42 of the adder 43. The adder 43 adds the correction value with the right sign in respect to the processed signal contained in the memory 38 and issues the correct measured value as the output signal 46. The offset error, which occurs as an additive error during the detection of a measured value, is newly detected during each new start-up of the circuit arrangement 10, 11 by actuating the circuit closer 16, is stored in the memory 38 and is employed for obtaining the correct measured value during the subsequent operation of the first circuit element 10.

In place of the shown arrangement of the adder 43 downstream of the signal processing unit 41, it is easily possible to provide the adder 43 upstream of the signal processing unit 41 if an amplification factor, which possibly is different from the value One, of the signal processing unit 41 is taken into consideration.

In the represented exemplary embodiment, the output signal 46 is further employed for realizing a regulation of the electrical output converted in the electrical consumer 13. The output is obtained by multiplying the output signal 46 corresponding to the current flowing in the consumer 13 with the measured voltage value which can be picked up at the central tap 34 of the potentiometer 31 and which is a measurement of the voltage applied to the electrical consumer or load 13. To the extent that, in place of the potentiometer 31 realized by means of passive components, the two resistors 32, 33, an also active component, such as an operational amplifier, for example, is provided, it is easily possible to provide a further memory 38 as well as a further adder 43 for the correction of the detected and processed measured voltage value. The multiplier 47 sends the determined result 48 to the control unit 36 which performs a pulse-width modulation of the control signal 49, for example. To determine the ratio of pulse length to pulse pause of the pulse-modulated control signal 49, a power regulator, not shown in detail, is contained in the control unit 36, which compares a set output value taken, for example, from a stored table, with the actual output value obtained.

Another embodiment provides that the correction value stored in the memory 38 directly acts on the operational amplifier 45 and by means of this causes an offset error compensation. Various types of operational amplifiers 45 have an appropriate action possibility. The separate adder 43 can be omitted. However, in principle the direct action at the operational amplifier 45 corresponds to an additive signal influence.

The circuit arrangement in accordance with the invention having the two circuit sections or elements 10, 11 and with the gas discharge lamp 14 as the electrical consumer is preferably used in a motor vehicle, wherein the gas discharge lamp 14 is disposed in a headlight. In this application the operational amplifier 45 is subjected to rough environmental conditions which can result in a long-time drift of the offset error.

I claim:
1. A circuit arrangement with a first circuit section in which at least one signal to be processed occurs, and with a second circuit section containing a signal processing unit as well as a device for correcting the signal, with a memory contained in the device for signal correction which memory stores an idle level occurring at an output of the signal processing unit, and with the stored idle level being provided for correcting the processed signal, and wherein a switch-on delay unit is provided in the second circuit section which switch-on delay unit, following start-up of the two circuit sections, maintains the first circuit section in the switched-off state for the time (T) predetermined by the switch-on delay unit, the memory stores the occurring idle level during the predetermined time (T), and the signal correction is provided at the end of the predetermined time (T).

2. A circuit arrangement in accordance with claim 1 wherein the signal processing unit contains at least one operational amplifier.

3. A circuit arrangement in accordance with claim 1 wherein at least one measured value occurring in the first circuit section is provided as the signal.

4. A circuit arrangement in accordance with claim 3, wherein an electrical current flowing through an electrical consumer, which current is detected as a voltage drop at a measuring resister, is provided as the measured value.

5. A circuit arrangement in accordance with claim 1, wherein an adder is provided which, at the end of the time (T) predetermined by the switch-on delay, adds the correction value contained in the memory with the correct sign to the signal to be processed.

6. A circuit arrangement in accordance with claim 5, wherein the adder is disposed at the output of the signal processing unit.

7. A circuit arrangement in accordance with claim 1, wherein the switch-on delay unit cooperates with a control unit, which emits a control signal for a switching element arranged in the first circuit section.

8. A circuit arrangement in accordance with claim 7, wherein the switching element is provided in a timed current supply.

9. A circuit arrangement in accordance with claim 4, wherein the detection of the current flowing through the electrical consumer is provided for an output regulation of an electrical output converted in the electrical consumer.

10. A circuit arrangement in accordance with claim 9, wherein a gas discharge lamp is provided as the electrical consumer, which is employed in a headlight of a motor vehicle.

11. A circuit arrangement comprising: a first circuit section in which at least one signal to be controlled occurs, and a second circuit section containing a signal processing unit connected to the first circuit section for processing a value corresponding to the at least one signal, and a device responsive to the processed signal and having an output connected to the first circuit section, for correcting the at least one signal; a memory disposed in the second circuit section; a switch-on delay unit provided in the second circuit section which switch-on delay unit, following each start-up of the first and second circuit sections, maintains the first circuit section in a switched-off state for a time (T) predetermined by the switch-on delay unit; and a switch, controlled by the switch-on delay unit, for connecting the memory to an output of the signal processing unit to store an occurring idle signal level during the predetermined time (T), and for connecting the memory to the device for correcting at the end of the predetermined time (T) to correct the at least one signal utilizing the idle signal value stored in the memory.

* * * * *